US008526095B2

(12) United States Patent
Fukuoka et al.

(10) Patent No.: US 8,526,095 B2
(45) Date of Patent: Sep. 3, 2013

(54) ELECTROCHROMIC DISPLAY DEVICE

(75) Inventors: Toshimi Fukuoka, Tsukuba (JP); Wu Weng, Tsukuba (JP); Tetsuya Higuchi, Tsukuba (JP); Masao Suzuki, Tsukuba (JP); Rikuo Takano, Tsukuba (JP); Makoto Omodani, Hiratsuka (JP)

(73) Assignees: Funai Electric Advanced Applied Technology Research Institute Inc., Daito-shi (JP); Tokai University Educational System, Tokyo (JP); Funai Electric Co., Ltd., Daito-shi (JP)

( * ) Notice: Subject to any disclaimer, the term of this patent is extended or adjusted under 35 U.S.C. 154(b) by 572 days.

(21) Appl. No.: 12/770,022

(22) Filed: Apr. 29, 2010

(65) Prior Publication Data

US 2010/0277787 A1 Nov. 4, 2010

(30) Foreign Application Priority Data

Apr. 30, 2009 (JP) ................................. 2009-110286

(51) Int. Cl.
*G02F 1/153* (2006.01)

(52) U.S. Cl.
USPC ............ 359/267; 359/265; 359/268; 359/273

(58) Field of Classification Search
USPC .................................................. 359/265–275
See application file for complete search history.

(56) References Cited

U.S. PATENT DOCUMENTS 7,453,435 B2 * 11/2008 Edwards ...................... 345/105
2008/0316573 A1 12/2008 Shim et al.

FOREIGN PATENT DOCUMENTS

| | | | |
|---|---|---|---|
| EP | 1 376 214 | A1 | 1/2004 |
| JP | 52-73052 | A | 6/1977 |
| JP | 1-105917 | A | 4/1989 |
| JP | 2003-270671 | A | 9/2003 |
| JP | 2008-32911 | A | 2/2008 |
| WO | WO 2004/001496 | A1 | 12/2003 |

OTHER PUBLICATIONS

The Extended European Search Report dated Sep. 2, 2010 (twelve (12) pages).

Aliev A.E. et al., "Image diffusion and cross-talk in passive matrix electrochromic displays", Display Devices, Dempa Publicatiions, Tokyo, Japan, vol. 23, No. 5, Nov. 1, 2002, pp. 239-247, XP004390155.

(Continued)

*Primary Examiner* — Evelyn A. Lester
(74) *Attorney, Agent, or Firm* — Crowell & Moring LLP

(57) ABSTRACT

Disclosed is an electrochromic display device comprising: a first and a second substrates; a first and a second electrodes; and an electrochromic composition layer, wherein the device is of a passive matrix drive where the a display and an erasion are performed by an energization in reverse directions between the electrodes, the first and the second electrodes respectively comprise a plurality of electrodes, a pixel is formed where the electrodes are in a grade separated crossing, and the display is performed by voltage application processing where: (i) the first electrode is set as negative, and the second electrode is set as positive, to apply a voltage of a first potential difference, immediately followed by (ii) the first electrode being set as positive, and the second electrode being set as negative, to apply a voltage of a second potential difference equal to or more than the first potential difference.

6 Claims, 9 Drawing Sheets

(56) References Cited

OTHER PUBLICATIONS

Carpi F. et al, "Colours from electroactive polymers: Electrochromic, electroluminescent and laser devices based on organic materials", Optics and Laser Technology, Elsevier Science Publishers BV., Amsterdam, Netherlands, vol. 38, No. 4-6, Jun. 1, 2006, pp. 292-305, XP025251663.
European Office Action dated Dec. 2, 2011 (eight (8) pages).
Japanese Office Action dated May 28, 2013 w/ English translation (five (5) pages).

* cited by examiner

EXAMPLE 1-1 WHEREIN 8 MSEC/ LINE

EXAMPLE 1-2 WHEREIN 2 MSEC/ LINE

COMPARATIVE EXAMPLE 1-1 WHEREIN 8 MSEC/ LINE

COMPARATIVE EXAMPLE 1-2 WHEREIN 2 MSEC/ LINE

ELECTROCHROMIC DISPLAY DEVICE

BACKGROUND OF THE INVENTION

1. Field of the Invention

The present invention relates to an electrochromic display device.

2. Description of Related Art

The publications in the forms of electronic books, that is, electronic publishing, have come to be actively performed in place of the publications by conventional printing techniques as electronic information networks have spread. As the apparatus displaying electronic information to be distributed in these networks, for example, cathode ray tube (CRT) displays and back light type liquid crystal displays have been used. However, the displays by means of these displays are restricted in places to be read, and are inferior also in the handling aspects of the displays in terms of their weights, sizes, shapes, and portability in comparison with the common displays printed on paper. Moreover, because these displays consume much electric power, the restriction of display times is also caused in the case of battery drives. Furthermore, all of these displays is a light emitting type display, and has the problem of causing extreme fatigue at the time of a long hour steady gaze.

Consequently, a display device capable of settling the problems mentioned above is desired, and further a rewritable display device is desired. As these display devices, a display called a paper-like display or electronic paper has been proposed. To put it concretely, for example, the following display devices have been proposed in the past: the display device of a reflective liquid crystal system, the display device of an electrophoretic system, the display device of the system of rotating dichromatic particles in an electric field, and the display device of an electrochromic system (see, for example, Japanese Patent Application Laid-Open Publication Nos. 2003-270671 and 2008-032911).

Incidentally, a display device of the electrochromic system (electrochromic display device) performs the display of an image and the erasion of the displayed image in the manner as shown in FIG. 11, for example. That is, the display of image is performed by an energization to color the pixels which are selected (selection pixels), in which a negative voltage is applied to a line electrode (a first electrode) to form selection pixels, and a positive voltage is applied to a data electrode (a second electrode) to form the selection pixels. Further, the erasion of the displayed image is performed by an energization which is in the reverse direction of the energization performed to color the selection pixels, in which the positive voltage is applied to the first electrode, and the negative voltage is applied to the second electrode.

However, an electrolyte solution is filled in between the electrodes. Thereby, when the energization to color the selection pixels is performed, the electrodes to form the selection pixels are polarized, so as to bring about a state of such as an electrolyte capacitor, a battery cell, or the like. That is to say, after the energization to color the selection pixels is performed, an electric charge remains in between the electrodes which form the selection pixels. Such electric charge moves out to the surroundings through the electrolyte solution, to reach in between the electrodes which form the non-selection pixels. Accordingly, for example, when a high-speed scanning is performed to display a given image repeatedly, the next energization happens to be performed before the remaining electric charge has been eliminated. Thus, the electric charge is to be accumulated in between the electrodes which form the non-selection pixels, and the non-selection pixels happen to be colored. Thereby, there has been a problem that a blurred image happens to be displayed, in which the selection pixels appear to be smudged. Accordingly, it may be conceived that a partition wall be formed in between the pixels in order to prevent the remaining electric charge from moving so that the pixels are separated. However, forming such partition walls requires accuracy and meticulousness for positioning, and the like, thus results in a great deal of burden.

Further, when the high-speed scanning is performed, and the displayed image is erased before the remaining electric charge is eliminated, there also is a problem that the erasion takes much time due to the influence from the remaining electric charge.

SUMMARY OF THE INVENTION

The present invention is directed to realizing a high-speed display and a high-speed erasion of an image with high quality in an electrochromic display device which is driven by a passive matrix drive, without being provided with a partition wall.

According to an aspect of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a negative electrode, and the second electrode forming the selection pixel is set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode.

According to another aspect of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a positive electrode, and the second electrode forming the selection pixel is set as a negative electrode, to apply a voltage of a first potential difference in between the first electrode and the second electrode, immediately followed by (ii) the first electrode being set as the negative electrode, and the second electrode being set as the positive electrode, to apply a voltage of a second potential difference which is equal to or more than the first potential difference in between the first electrode and the second electrode.

According to still another aspect of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, first voltage application processing and second voltage application processing are performed one after another, wherein the first voltage application processing comprises: (i) the first electrode forming a selection pixel being set as a negative electrode, and the second electrode forming the selection pixel being set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode, and wherein the second voltage application processing comprises: (iii) the first electrode forming the selection pixel being set as a positive electrode, and the second electrode forming the selection pixel being set as a negative electrode, to apply a voltage of a first potential difference in between the first electrode and the second electrode, immediately followed by (iv) the first electrode being set as the negative electrode, and the second electrode being set as the positive electrode, to apply a voltage of a second potential difference which is equal to or more than the first potential difference in between the first electrode and the second electrode.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

In the following, an embodiment of the present invention will be described in detail with reference to the accompanying drawings. Incidentally, the scope of the invention is not limited to the shown examples.

(Display Apparatus)

The display apparatus 1000 is the apparatus that is equipped with the electrochromic display device 100 and performs given display processing in accordance with image data input from the outside.

Figure 1:
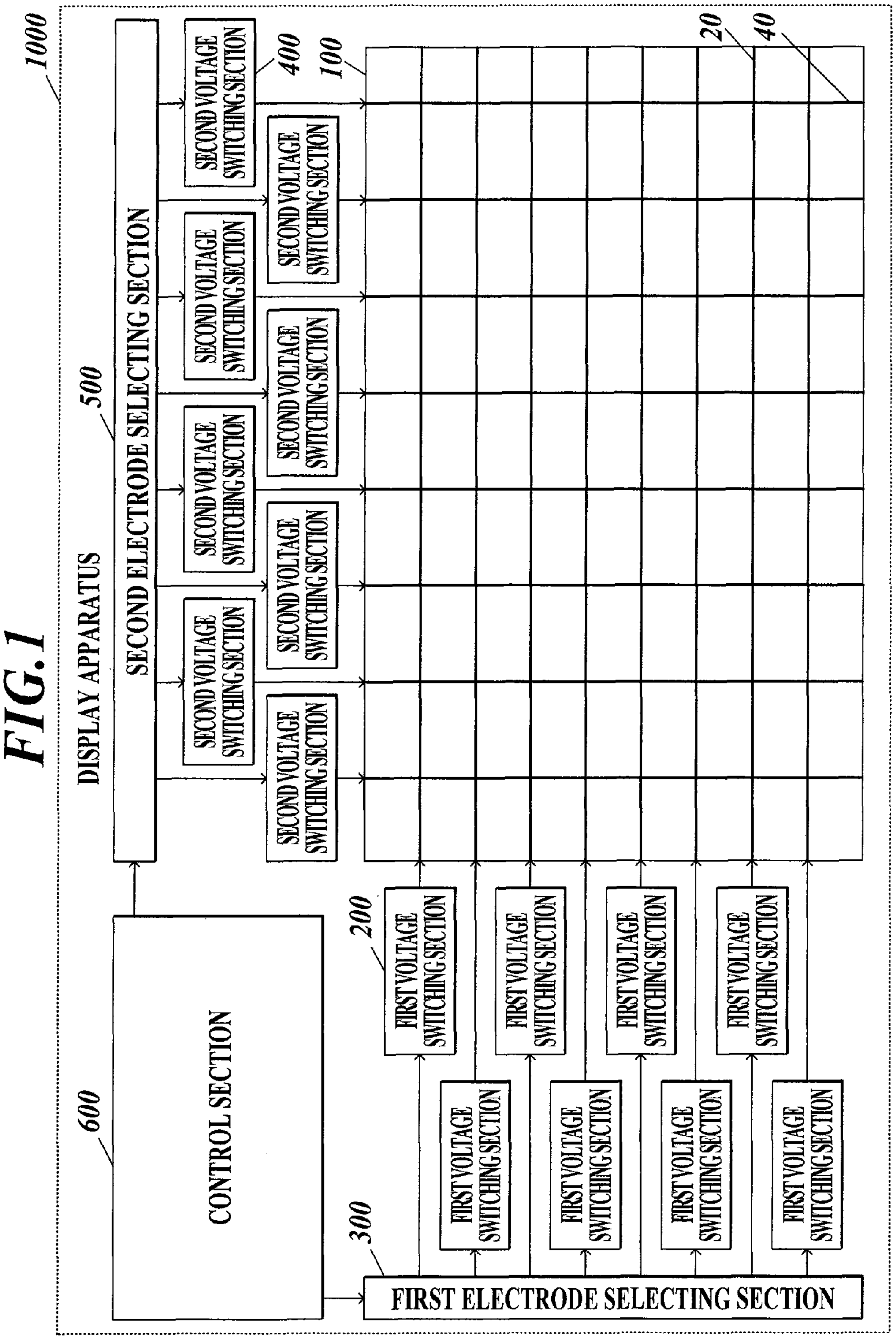
FIG. 1 is a block diagram showing an example of a functional configuration of a display apparatus equipped with an electrochromic display device according to the present invention.

To put it concretely, for example, as shown in FIG. 1, the display apparatus 1000 includes the electrochromic display device 100, the first voltage switching sections 200, a first electrode selecting section 300, the second voltage switching sections 400, a second electrode selecting section 500, a control section 600, and the like.

(Electrochromic Display Device)

Figure 2A:
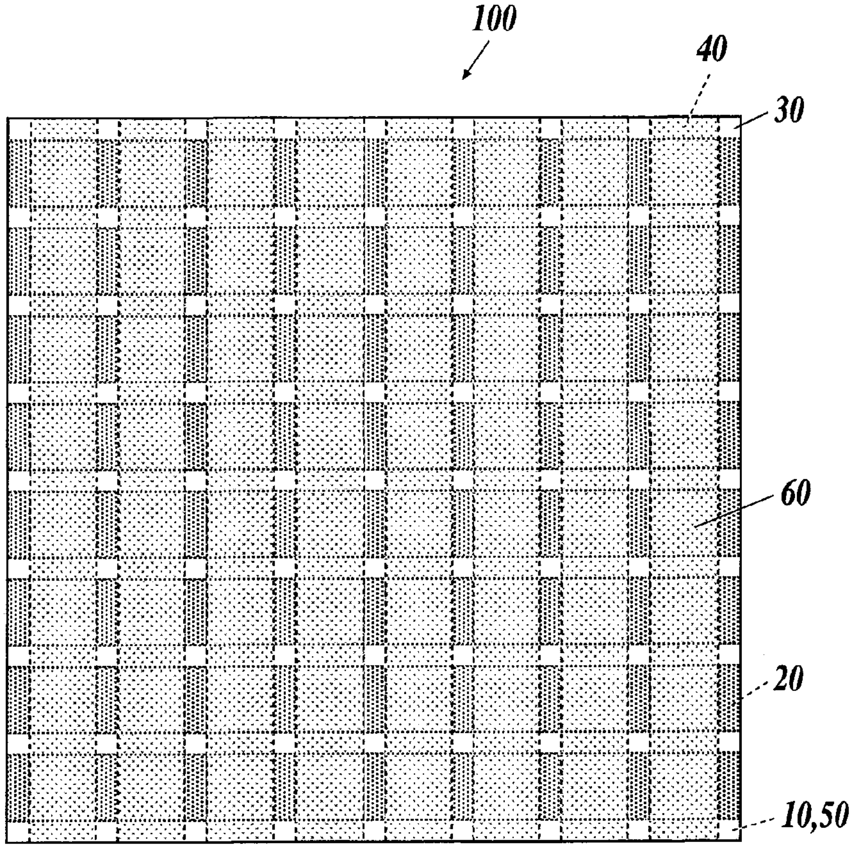
FIG. 2A is a plan view schematically showing an example of the electrochromic display device according to the present invention.
Figure 2B:
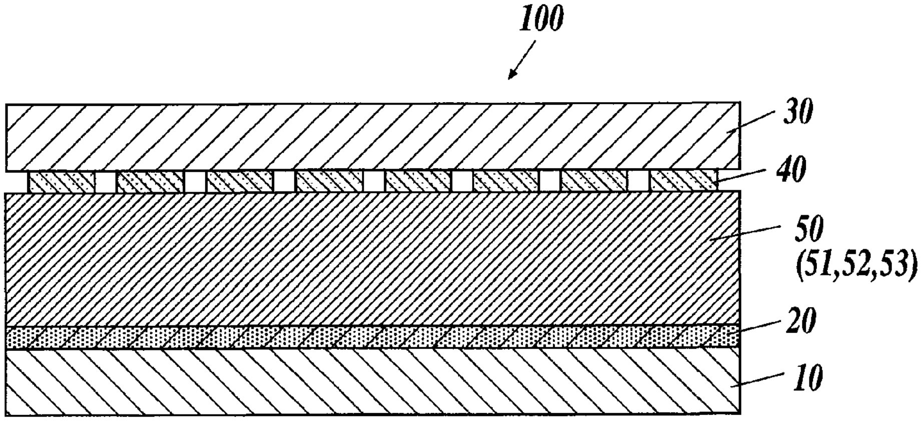
FIG. 2B is a sectional view showing the example of the electrochromic display device according to the present invention.

For example, as shown in FIG. 2, the electrochromic display device 100 is the display device of a passive matrix drive that is composed of a first substrate 10, first electrodes 20 formed on the upper surface of the first substrate 10, a second substrate 30 provided above the first substrate 10 to be opposed to the first substrate 10, second electrodes 40 formed on the under surface of the second substrate 30, and an electrochromic composition layer 50 provided between the first substrate 10 and the second substrate 30.

The electrochromic display device 100 is adapted to execute a display by energizations between the first electrodes 20 and the second electrodes 40, and to execute the erasion of the display by the energizations in the directions reverse to those of the energizations for the display between the first electrodes 20 and the second electrodes 40.

The first electrodes 20 are, for example, a plurality of electrodes extending in parallel with each other. The second electrodes 40 are, for example, transparent display electrodes composed of a plurality of transparent electrodes extending in parallel with each other in the directions perpendicular to those of the first electrodes 20. Then, pixels 60 are formed in the regions in which the first electrodes 20 and the second electrodes 40 are in grade separated crossing.

The first substrate 10 is formed in, for example, a plane, and has the function of the base substance of the electrochromic display device 100.

The quality of material of the first substrate 10 is not especially limited as long as the material has an electrical insulation property. For example, glass and plastic can be used as the first substrate 10. As the glass, for example, the following kinds of glass can be given: soda-lime glass, low-alkali borosilicate glass, no-alkali borosilicate glass, no-alkali aminosilicate glass, and silica glass. Moreover, as the plastic, for example, the following kinds of plastic can be given: polyesters, such as polyethylene terephthalate and polyethylene naphtahalate; polyamides; polycarbonates; fluorinated polymers, such as polyvinylidene fluoride; polyethers; polyolefins, such as polystyrene and polyethylene; and polyimides.

It is preferable that the first substrate 10 looks white. Accordingly, when the quality of material of the first substrate 10 is glass or plastic, then it is possible to form the first substrate 10 that looks white by blending, for example, a white pigment, such as a titanium dioxide, a barium sulfate, and kaolin. Moreover, it is possible to form the first substrate 10 that looks white by applying the white pigment on the under surface of a transparent substrate, or by arranging a white sheet such as a sheet of white paper and a white polyethylene terephthalate (PET) sheet on the under surface.

The first electrodes 20 are formed, for example, in lines, each having a width, and are provided in stripes in parallel with each other at regular intervals.

The first electrodes 20 are provided on the upper surface of the first substrate 10 so as to contact with the electrochromic composition layer 50 and so as to be opposed to the second electrodes 40 with the electrochromic composition layer 50 put between the first and second electrodes 20 and 40.

The first electrodes 20 have the functions of energizing the electrochromic composition layer 50 by being paired with the second electrodes 40.

The first electrodes 20 form grade separated crossings with the second electrodes 40, that is, cross with the second electrodes 40 with intervals, and the pixels 60 are formed in the regions surrounded by the crossing points.

The first electrodes 20 are not especially limited, and may be transparent electrodes or opaque electrodes as long as the electrodes are oxidized in at least their surfaces. To put it concretely, as each of the first electrodes 20, for example, the followings can be given: an indium tin oxide (ITO) thin film; a thin film including a coated oxide film of $SnO_2$, $InO_2$, or the like; an ITO thin film doped by Sn or Sb; a thin film including a coated oxide film of $SnO_2$, $InO_2$, or the like, and doped Sn or Sb; a zinc oxide thin film; a magnesium oxide thin film; an aluminum oxide thin film; a chromium oxide thin film; a nickel oxide thin film; and a titanium oxide thin film. Moreover, the first electrodes 20 may be thin films each including a coated oxide film of an ITO, a zinc oxide, a magnesium oxide, an aluminum oxide, a chromium oxide, a nickel oxide, a titanium oxide, and the like.

The second substrate 30 is, for example, a transparent substrate formed in a plane, and has the function as a supporting body of the second electrodes 40.

The quality of material of the second substrate 30 is not especially limited as long as the material is the transparent substrate having an electrically insulation property. For example, glass and plastic can be used as the second substrate 30. As the glass, for example, the following kinds of glass can be given: soda-lime glass, low-alkali borosilicate glass, no-alkali borosilicate glass, no-alkali aminosilicate glass, and silica glass. Moreover, as the plastic, for example, the following kinds of plastic can be given: polyesters, such as polyethylene terephthalate and polyethylene naphtahalate; polyamides; polycarbonates; fluorinated polymers, such as polyvinylidene fluoride; polyethers; polyolefins, such as polystyrene and polyethylene; and polyimides.

The second electrodes 40 are, for example, transparent electrodes formed in lines, each having a width, and are provided in stripes parallel to each other at regular intervals.

The second electrodes 40 are provided on the under surface of the second substrate 30 so as to contact with the electrochromic composition layer 50 and so as to be opposed to the first electrodes 20 with the electrochromic composition layer 50 put between the second electrode 40 and the first electrodes 20.

The second electrodes 40 have the functions of energizing the electrochromic composition layer 50 by being paired with the first electrodes 20.

The second electrodes 40 form grade separated crossings with the first electrodes 20, that is, cross with the first electrodes 20 with intervals, and the pixels 60 are formed in the regions surrounded by the crossing points.

The second electrodes 40 are not especially limited as long as the second electrodes 40 may be the transparent electrodes oxidized in at least their surfaces. To put it concretely, as each of the second electrodes 40, for example, the followings can be given: an ITO thin film; a thin film including a coated oxide film of $SnO_2$, $InO_2$, or the like; an ITO thin film containing doped Sn or Sb; a thin film containing a coated oxide film of $SnO_2$, $InO_2$, or the like and doped Sn or Sb; a zinc oxide thin film; and a magnesium oxide thin film. Moreover, the second electrodes 40 may be thin films, each including a coated oxide film or the like of an ITO, a zinc oxide, a magnesium oxide, an aluminum oxide, a chromium oxide, a nickel oxide, a titanium oxide, and the like.

The electrochromic composition layer 50 comprises for example, a spacer 51, an electrochromic composition 52 which is supported by the spacer 51, and the like.

The thickness of the electrochromic composition layer 50 is not especially limited, but it is possible to effectively manifest the display functions of the electrochromic composition 52 by setting the thickness of the electrochromic composition layer 50 to be preferably within a range of 10-500 μm, or more preferably within a range of 30-200 μm.

The spacer 51 has the roles of holding the electrochromic composition 52 of fixed volumes between the first substrate 10 and the second substrate 30. That is, the spacer 51 has the roles of supporting the electrochromic composition 52 between the first substrate 10 and the second substrate 30 by including the electrochromic composition 52, and the roles for controlling the quantities of the electrochromic composition 52 to be uniform by the thicknesses of the spacer 51.

The spacer 51 may be formed of an arbitrary material as long as it fulfils the above described rolls. For example, a plate-like body or a sheet-like body with porous property, a granular body (either with porous property or non-porous property), and the like, may be cited as the spacer 51.

In a case where the spacer 51 has a plate-like body or a sheet-like body, for example, the electrochromic composition 52 may be introduced into fine pores of the spacer 51, thereby the electrochromic composition layer 50 may be formed. In this case, the electrochromic composition 52 may be introduced into the fine pores of the spacer 51 to form the electrochromic composition layer 50 after the spacer 51 is sandwiched by the first electrodes 20 (the first substrate 10 where the first electrodes 20 are provided) and the second electrodes 40 (the second substrate 30 where the second electrodes 40 are provided). Alternatively, the electrochromic composition layer 50 may be sandwiched by the first electrodes 20 and the second electrodes 40 after the electrochromic composition 52 is introduced into the fine pores of the spacer 51 to form the electrochromic composition layer 50.

Here, in view of improving the display performance of the electrochromic display device 100, and the like, the plate-like body or the sheet-like body with porous property, preferably has fine pores which penetrate the first substrate 10 and the second substrate 30 in the substantially perpendicular direction. To put it concretely, for example, an anodized alumina, a mesh (net)-like sheet material, and the like may be cited, although not limited to these.

Further, in a case where the spacer 51 has a granular body, for example, the spacer 51 and the electrochromic composition 52 which are mixed to be of a paste form may be sandwiched by the first electrodes 20 and the second electrodes 40, thereby the electrochromic composition layer 50 may be formed.

The electrochromic composition 52 contains a supporting electrolyte, a polar solvent, and a leuco dye.

Then, display quality deterioration inhibitors (compounds, each having a hydroquinone derivative and/or a catechol derivative, a ferrocene derivative, and a carbonyl group) for inhibiting the deterioration of the display quality of the electrochromic display device 100, and adsorbents 53 adsorbing the leuco dyes at the time of energizations for the erasions between the first electrodes 20 and the second electrodes 40 are added to the electrochromic composition 52.

Moreover, as a component capable of being added to electrochromic composition 52, for example, a polymer compound for adjusting the physical properties (such as thickening) of electrochromic composition 52 can be given.

The electrochromic composition 52 has the function of the coloring and the erasing of a display of the electrochromic display device 100.

To put it concretely, the electrochromic composition 52 performs the coloring by the energizations between the first electrodes 20 and the second electrodes 40, and performing the erasing by the energizations in the directions reverse to those of the energizations for the coloring or by intercepting the energizations for the coloring.

The electrochromic composition 52 has only to have fluidity, and may be, for example, in the form of a liquid having low viscosity, in the form of paste having high viscosity, or in the form of a gel having small fluidity.

The supporting electrolytes, which are constituents of the electrochromic composition 52, have the functions of making currents easy to flow through the electrochromic composition 52. The supporting electrolytes contain compounds generally called molten salts. Each of the supporting electrolytes may use each compound individually, or may use a plurality of compounds in a mixed state.

It is preferable to add the supporting electrolytes so as to be 0.01-20 weight % of the whole weight of the electrochromic composition 52, and it is more preferable to add the supporting electrolytes so as to be 0.1-20 weight % of the whole weight in order to manifest the aforesaid function sufficiently.

To put it concretely, the supporting electrolytes are not especially limited as long as the supporting electrolytes are compounds having the aforesaid functions, and for example, the first supporting electrolyte compounds and/or the second supporting electrolyte compounds may be cited.

As the first supporting electrolyte compounds, for example, the compounds of, $NaClO_4$, $LiClO_4$, $KClO_4$, $RbClO_4$, $CsClO_4$, $NH_4ClO_4$, $LiBF_4$, and $LiPF_6$ may be cited, although not limited to these.

Further, as the second supporting electrolyte compounds, for example, the compounds of, $(CH_3)_4NClO_4$, $(C_2H_5)_4NClO_4$, $(n\text{-}C_4H_9)_4NClO_4$, $(CH_3)_4NBF_4$, $(C_2H_5)_4NBF_4$, $(n\text{-}C_4H_9)_4NBF_4$, $(CH_3)_4NCl$, $(C_2H_5)_4NCl$, $(CH_3)_4NBr$, $(C_2H_5)_4NBr$, $(n\text{-}C_4H_9)_4NBr$, $(n\text{-}C_4H_9)_4NI$, $C_6H_5(CH_3)_3NClO_4$, $C_6H_5(C_2H_5)_3NClO_4$, $C_8H_{17}(CH_3)_3NClO_4(C_2H_5)_4NPF_6$, $(n\text{-}C_4H_9)_4NPF_6$, $(CH_3)_4NCF_3SO_3$, and $(C_2H_5)_4NCF_3SO_3$ may be cited, although not limited to these.

The polar solvent, which is a constituent of the electrochromic composition 52, is at least a kind of organic solvents using supporting electrolytes and exhibiting energization properties, and has the function of accelerating the erasing of the colored leuco dye by intercepting a voltage and/or a current. Moreover, the polar solvent also fulfills the function of the solvent of a polymer compound when the polymer compound is added to the electrochromic composition 52. As the polar solvent, various polar solvents may be individually used, or two kinds or more of polar solvents may be used in suitable combinations with each other.

In the following, the examples of suitable polar solvents will be shown, but these examples are illustrations, and do not limit the scope of the polar solvents.

As the concrete examples of the polar solvents, for example, the followings can be given: N-methylpyrrolidone, dimethylformamide, diethylformamide, N,N-dimethylacetamide, propylene carbonate, dimethyl sulfoxide, γ-butyrolactone, acetonitrile, propionitrile, and butyronitrile. Although any of the illustrated polar solvents is preferable as the polar solvents to be used for one of the constituents of the electrochromic composition 52, N,N-dimethylacetamide can be given as the especially preferable polar solvent.

The leuco dye, one of the constituents of the electrochromic composition 52, is a colorless or light-colored electron donative precursor of a dye, and is a compound to be colored by a developer, such as a phenolic compound, an acidic substance, or an electron-accepting substance.

As the leuco dye, for example, the compounds which include lactone, lactam, sultone, spiropyran, ester, or an amide structure at their partial skeletons and can be practically colorless can be given. To put it concretely, for example, a triarylmethane compound, a bis-phenyl methane compound, a xanthenes compound, a fluoran compound, a thiazine compound, and a spiropyran compound can be given, but the leuco dye is not limited to the ones mentioned above.

The leuco dye can perform the coloring of various colors by being suitably selected among the compounds mentioned above. Consequently, the display color of the electrochromic display device 100 using the leuco dyes can be suitably selected on the basis of the leuco dyes. To put it concretely, for example, in the case of using the leuco dyes coloring to be black, a black-and-white display and a gray display can be performed.

Because the blending quantities of the leuco dyes depend on the solubility of the leuco dyes, it is difficult to unconditionally express the blending quantities, but it is necessary that sufficient quantities of the leuco dyes for coloring are blended. In the case of the leuco dyes having small solubility, it is preferable to adjust the blending quantities of the leuco dyes by, for example, enlarging the volumes (the thickness of the spacer 51) of the electrochromic composition layer 50 corresponding to the respective pixels 60 so that necessary quantities may be included.

The display quality deterioration inhibitors to be added to the electrochromic composition 52 are compounds having the functions of suppressing the deteriorations of the display quality of the electrochromic display device 100 accompanying the repetition operations of the coloring and the erasing of the leuco dyes.

The addition quantities of the display quality deterioration inhibitors are preferably 1-20 weight % of the contained quantities of the leuco dyes, and the addition quantities are more preferably 5-20 weight % in order to manifest the aforesaid functions sufficiently.

Each of the display quality deterioration inhibitors is a mixture of a first display quality deterioration suppressing compound (hydroquinone derivative and/or catechol derivative), a second display quality deterioration suppressing compound (ferrocene derivative), and a third display quality deterioration suppressing compound (the compound containing a carbonyl group (acetophenone derivative and/or dibenzoyl derivative).

Each of the adsorbents 53 to be added to the electrochromic composition 52 is, for example, an aluminum oxide and/or an aluminum hydroxide.

The modes of the adsorbents 53 (aluminum oxides and/or aluminum hydroxides) are not especially limited, but it is preferable to add the adsorbents 53 into the electrochromic composition 52 in the state of powder, to disperse the adsorbents 53 to be uniform by means of ultrasonic waves, a ball mill, or a homogenizer, such as a homomixer, and to use the adsorbents 53 as a dispersion liquid of the solution of the electrochromic composition 52.

The addition quantity of each of the adsorbents 53 varies according to the activity ratios, the particle diameters, and the like of the aluminum oxide and/or the aluminum hydroxide to be used.

Any of an aluminum oxide having a small surface area, such as alpha alumina, a large aluminum oxide having a particle diameter of 10 μm or more, an aluminum hydroxide having a small surface area, and an aluminum hydroxide having a particle diameter of 10 μm or more has a small adsorption effect of the leuco dyes, and accordingly it is preferable to add 0.5-5 grams of each of them to 1 gram of the leuco dye in order to manifest a sufficient adsorption operation, and is more preferable to add 1-3 grams of each of them.

Moreover, any of an aluminum oxide having a large surface area, such as gamma alumina, a small aluminum oxide having a particle diameter of 1 μm or less, an aluminum hydroxide having a large surface area, and an aluminum hydroxide having a small particle diameter of 1 μm or less has a large adsorption effect of the leuco dyes, and consequently the addition of 0.1-0.5 gram of each of them to 1 gram of the leuco dye manifests a sufficient adsorption operation.

Moreover, the class of activated alumina to be used for thin-layer chromatography or the like manifests a sufficient adsorption operation by adding 0.1-0.5 gram of the activated alumina to 1 gram of the leuco dye even when the activated alumina includes large particles each having a particle diameter of several tens μm.

The adsorbents 53 adsorbing the leuco dyes can be easily obtained as commercially available products.

In the following, examples of the suitable commercially available adsorbents 53 will be shown, but those are illustrations, and do not limit the scope of the adsorbents 53.

As the concrete examples of the commercially available adsorbents 53, for example, the followings can be given: aluminum oxide 60G Neutral for thin-layer chromatography (having particle diameters of 4-50 μm) available from Merk & Co., Inc.; low soda alumina LS235 (particle diameter of 0.47 μm), activated alumina C200 (particle diameter of 4.4 μm), and aluminum hydroxide B1403 (particle diameter of 1.5 μm), all available from Nippon Light Metal Co., Ltd.; and gamma alumina KC501 (particle diameter of 1 μm) available from Sumitomo Chemical Co., Ltd.

Each of the polymer compounds to be added to the electrochromic composition 52 has the function of heightening the viscosity of the electrochromic composition 52 to make the handling of them easily. Various polymer compounds may be used individually, or two kinds or more of the polymer compounds may be combined with each other to be used.

The polymer compounds are used for heightening the viscosity of the electrochromic composition 52, and the properties of the electrochromic composition 52 in this case can be made to be in the forms of liquids having low viscosity, paste having high viscosity, and gels having small fluidity.

The preferable blending quantities of the polymer compounds are 0.1-80 weight % of all the weights of the electrochromic composition 52.

In the following, examples of suitable polymer compounds will be shown, but those are illustrations, and do not limit the scope of the polymer compounds.

As the concrete examples of the polymer compounds, for example, the followings can be given: a polyvinylidene fluoride; a polyvinylidene chloride; a polyalkylene oxide such as a polyethylene oxide; a polymer molecule having repeating units of polyalkylene imine and polyalkylene sulfide; polymethyl methacrylate; polyacrylonitrile; polycarbonate; and a polyvinyl formal such as polyvinyl butyral. As the especially preferable polymer compounds, polyvinyl butyral and polyvinylidene fluoride can be given.

The electrochromic composition 52 described above is examples, and the other compositions introduced between the spacer 51 can be used as the electrochromic composition layer 50 as long as the compositions can be electrochemically colored.

(First Voltage Switching Section)

The display apparatus 1000 includes the plurality of first voltage switching sections 200 (for example, the same number as that of the first electrodes 20 included in the electrochromic display device 100), for example, as shown in FIG. 1.

Each of the first voltage switching sections 200 switches, for example, a voltage applied to the first electrode 20 connected to the first voltage switching section 200 between a positive voltage and a negative voltage.

Figure 3:
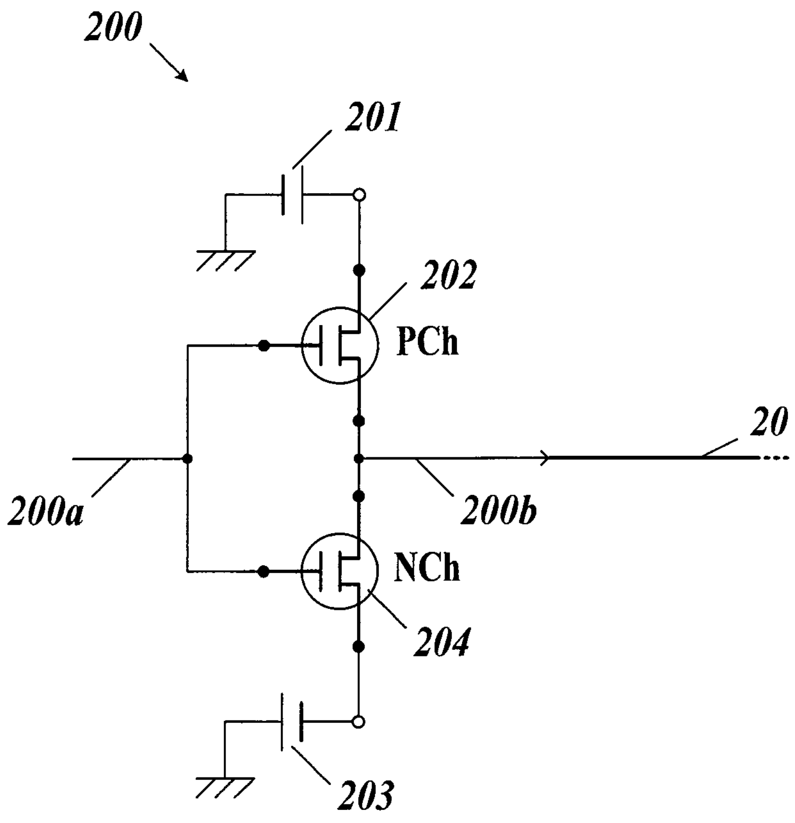
FIG. 3 is a diagram showing an example of a circuit configuration of a first voltage switching section provided in the display apparatus equipped with the electrochromic display device according to the present invention.

To put it concretely, for example, as shown in FIG. 3, each of the first voltage switching sections 200 includes a first positive voltage power source 201 outputting a positive voltage, a first P channel transistor 202 functioning as a switch, a first negative voltage power source 203 outputting a negative voltage, a first N channel transistor 204 functioning as a switch, and the like.

The first positive voltage power source 201 is adapted to be turned on and off by, for example, the first electrode selecting section 300. When the first positive voltage power source 201 is turned on, the positive voltage is applied to one end (source) of the first P channel transistor 202.

The first P channel transistor 202 includes, for example, a gate connected to a gate terminal 200*a*, the one end (source) connected to the first positive voltage power source 201, and the other end (drain) connected to an output terminal 200*b* connected to the corresponding first electrode 20 of the electrochromic display device 100.

The first negative voltage power source 203 is adapted to be turned on and off by, for example, the first electrode selecting section 300. When the first negative voltage power source 203 is turned on, the negative voltage is applied to one end (source) of the first N channel transistor 204.

The first N channel transistor 204 includes, for example, a gate connected to the gate terminal 200*a*, the one end (source) connected to the first negative voltage power source 203, and the other end (drain) connected to the output terminal 200*b* connected to the corresponding first electrode 20 of the electrochromic display device 100.

(First Electrode Selecting Section)

The first electrode selecting section 300 applies positive voltages and negative voltages to the first electrodes 20 (line electrodes) by controlling the first voltage switching sections 200 in conformity with, for example, control signals input from the control section 600.

To put it concretely, the first electrode selecting section 300, for example, applies a predetermined positive voltage to the gate terminal 200*a* of one of the first voltage switching sections 200, and turns on the first positive voltage power source 201. Thereby, the predetermined positive voltage is applied to the gate of the first P channel transistor 202, and the positive voltage from the first positive voltage power source 201 is applied to the one end (source) of the first P channel transistor 202. Consequently, the first P channel transistor 202 is turned on, and the positive voltage is applied to the corresponding first electrode 20 through the output terminal 200*b*.

On the other hand, the first electrode selecting section 300, for example, applies a predetermined negative voltage to the gate terminal 200*a* of the first voltage switching section 200, and turns on the first negative voltage power source 203. Thereby, the predetermined negative voltage is applied to the gate of the first N channel transistor 204, and the negative voltage from the first negative voltage power source 203 is applied to the one end (source) of the first N channel transistor 204. Consequently, the first N channel transistor 204 is turned on, and the negative voltage is applied to the corresponding first electrode 20 through the output terminal 200*b*.

In the following, the positive voltage applied to the first electrode 20 is referred to as "the second positive voltage", and the negative voltage applied to the first electrode 20 is referred to as "the first negative voltage".

(Second Voltage Switching Section)

For example, as shown in FIG. 1, the display apparatus 1000 includes the plurality of second voltage switching sections 400 (for example, the same number as that of the second electrodes 40 included in the electrochromic display device 100).

Each of the second voltage switching sections 400 switches, for example, a voltage applied to the second electrode 40 connected to the second voltage switching section 400 between a positive voltage and a negative voltage.

Figure 4:
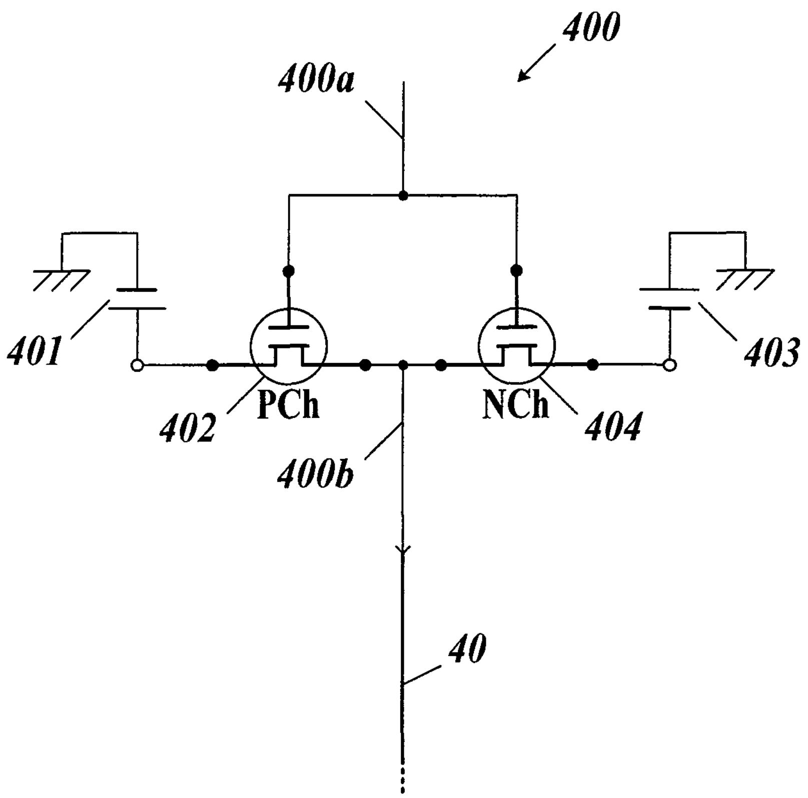
FIG. 4 is a diagram showing an example of a circuit configuration of a second voltage switching section provided in the display apparatus equipped with the electrochromic display device according to the present invention.

To put it concretely, for example, as shown in FIG. 4, each of the second voltage switching sections 400 includes a second positive voltage power source 401 outputting a positive voltage, a second P channel transistor 402 functioning as a switch, a second negative voltage power source 403 outputting a negative voltage, a second N channel transistor 404 functioning as a switch, and the like.

The second positive voltage power source 401 is adapted to be turned on and off by, for example, the second electrode selecting section 500. When the second positive voltage power source 401 is turned on, the positive voltage is applied to one end (source) of the second P channel transistor 402.

The second P channel transistor 402 includes, for example, a gate connected to a gate terminal 400*a*, the one end (source) connected to the second positive voltage power source 401, and the other end (drain) connected to an output terminal 400*b* connected to the corresponding second electrode 40 of the electrochromic display device 100.

The second negative voltage power source 403 is adapted to be turned on and off by, for example, the second electrode selecting section 500. When the second negative voltage power source 403 is turned on, the negative voltage is applied to one end (source) of the second N channel transistor 404.

The second N channel transistor 404 includes, for example, a gate connected to the gate terminal 400*a*, the one end (source) connected to the second negative voltage power source 403, and the other end (drain) connected to the output terminal 400*b* connected to the corresponding second electrode 40 of the electrochromic display device 100.

(Second Electrode Selecting Section)

The second electrode selecting section 500 applies positive voltages and negative voltages to the second electrodes 40 (data electrodes) by controlling the second voltage switching sections 400 in conformity with, for example, control signals input from the control section 600.

To put it concretely, the second electrode selecting section 500, for example, applies a predetermined positive voltage to the gate terminal 400*a* of one of the second voltage switching sections 400, and turns on the second positive voltage power source 401. Thereby, the predetermined positive voltage is applied to the gate of the second P channel transistor 402, and the positive voltage from the second positive voltage power source 401 is applied to the one end (source) of the second P channel transistor 402. Consequently, the second P channel transistor 402 is turned on, and the positive voltage is applied to the corresponding second electrode 40 through the output terminal 400*b*.

On the other hand, the second electrode selecting section 500, for example, applies a predetermined negative voltage to the gate terminal 400*a* of the second voltage switching section 400, and turns on the second negative voltage power source 403. Thereby, the predetermined negative voltage is applied to the gate of the second N channel transistor 404, and the negative voltage from the second negative voltage power source 403 is applied to the one end (source) of the second N channel transistor 404. Consequently, the second N channel transistor 404 is turned on, and the negative voltage is applied to the corresponding second electrode 40 through the output terminal 400*b*.

In the following, the positive voltage applied to the second electrode 40 is referred to as "the first positive voltage", and the negative voltage applied to the second electrode 40 is referred to as "the second negative voltage".

(Control Section)

The control section 600 includes, for example, a central processing unit (CPU), a read only memory (ROM), a random access memory (RAM), and the like, and controls the operation of each section constituting the display apparatus 1000 in a concentrated manner.

(Display Operation)

The control section 600 controls the first electrode selecting section 300 and the second electrode selecting section 500 on the basis of image data input from, for example, the outside, to make the electrochromic display device 100 display the image based on the image data by a passive matrix drive through the first voltage switching sections 200 and the second voltage switching sections 400.

To put it concretely, the control section 600 selects a pixel to be colored, and applies the voltage of the first potential difference between the first electrode 20, used as a negative electrode, and the second electrode 40, used as a positive electrode, both constituting the selected pixel (selection pixel), to display the selection pixel. Immediately after that, the control section 600 further applies the voltage of the second potential difference, which is equal to or more than the first potential difference between the first electrode 20, used as a positive electrode, and the second electrode 40, used as a negative electrode, both constituting the selected pixel (selection pixel), to color the selection pixel, and thereby the control section 600 makes the electrochromic display device 100 display an image.

Figure 5:
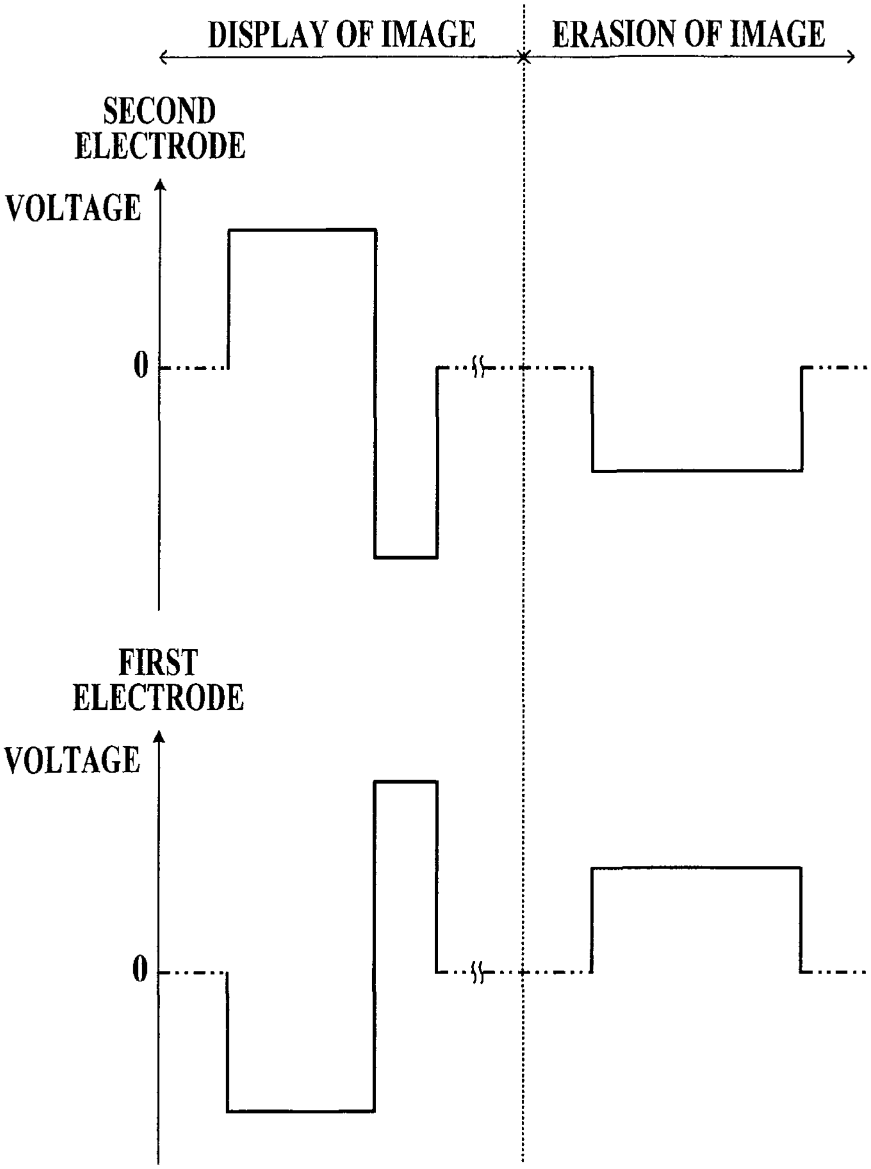
FIG. 5 is a diagram for illustrating an example of how to apply a voltage to the electrochromic display device according to the present invention.

To put it more concretely, the first electrode selecting section 300 selects the first electrode 20 in an order of the line of the first row (for example, the first electrode 20 provided at the top in FIG. 1)→the second row→the third row→ . . . , according to the control signal input from the control section 600. For example, as shown in FIG. 5, the first electrode selecting section 300 applies the first negative voltage to the selected first electrode 20, and immediately after that, the first electrode selecting section 300 applies the second positive voltage thereto. Incidentally, the plurality of first electrodes 20 are designed so as not to be selected together at the same time.

Further, the second electrode selecting section 500 selects the second electrode 40 in a state of being synchronized with the selection of the first electrode 20 by the first electrode selecting section 300, according to the control signal input from the control section 600. That is to say, when the first electrode 20 provided at the first row is selected by the first electrode selecting section 300, the second electrode selecting section 500 selects the second electrode 40 to form the pixel 60 to be colored provided at the first row. For example, as shown in FIG. 5, the second electrode selecting section 500 applies the first positive voltage to the selected second electrode 40, and immediately after that, the second electrode selecting section 500 applies the second negative voltage thereto.

That is to say, the first negative voltage is applied to the first electrode 20, and the first positive voltage is applied to the second electrode 40, thereby the voltage of the first potential difference is applied between the electrodes. Further, the second positive voltage is applied to the first electrode 20, and the second negative voltage is applied to the second electrode 40, thereby the voltage of the second potential difference is applied between the electrodes.

Here, in FIG. 5, the periods in which the voltage is not applied are indicated by virtual line (two-dot chain lines). The voltage in the first electrode 20 and in the second electrode 40 in the period in which the voltage is not applied is a voltage which remains naturally in the electrodes, which is actually not zero (0), thereby the periods are indicated by the virtual lines.

The first potential difference can be set arbitrarily, as long as it is a voltage between the electrodes capable of coloring the pixels. However, the pixels colored by the applied voltage of the first potential difference are to be subjected to color degradation by the applied voltage of the second potential difference. Thus, the first potential difference may preferably be the voltage between the electrodes so that the color after the color degradation is to be the desirable color. The first potential difference depends on the material of the first electrode 20 and the second electrode 40, and the like, thus the concrete first potential difference is difficult to be generally expressed, however, it for example ranges in 5V≦first potential difference≦8V.

Further, the second potential difference can be set arbitrarily, as long as it is a voltage between the electrodes capable of eliminating the electric charge generated in between the electrodes by the applied voltage of the first potential difference. To put it concretely, the second potential difference may, for example, preferably be first potential difference: second potential difference=1:1 to 1.5, by the ratio with respect to that of the first potential difference.

Still further, the sum of the time of the applied voltage of the first potential difference (application period) and the time of the applied voltage of the second potential difference (application period) is determined according to the scanning speed (which is the vertical scanning frequency). Accordingly, the application time of the voltage of the first potential difference and the application time of the voltage of the second potential difference may be suitably changed arbitrarily according to the scanning speed. However, in view of reliably eliminating the electric charge generated in between the electrodes by the applied voltage of the first potential difference, by the applied voltage of the second potential difference, the ratio of the application time of the voltage of the first potential difference and the application time of the voltage of the second potential difference may preferably be application time of the voltage of the first potential difference: application time of the voltage of the second potential difference=1:0.25 to 0.5.

Figure 6:
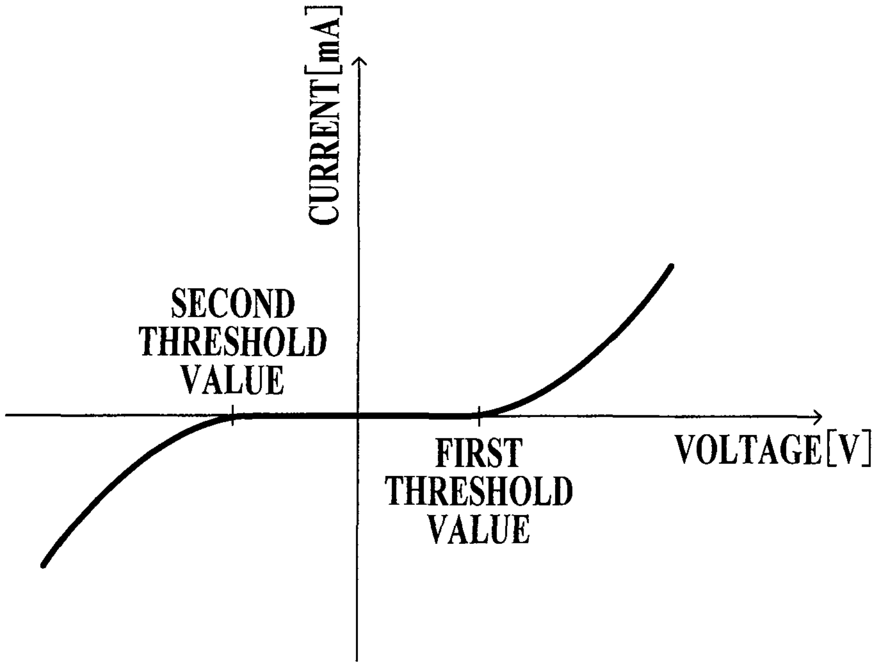
FIG. 6 is a diagram for illustrating a current-voltage characteristic between electrodes oxidized in at least their surfaces.

Because the first electrodes 20 and the second electrodes 40 are oxidized at least in their surfaces, each of the current-voltage characteristics between the first and second electrodes 20 and 40 becomes nonlinear, for example, as shown in FIG. 6. That is, each of the first electrodes 20 and the second electrodes 40 has the following characteristic: when a voltage larger than a first threshold value is applied between the electrodes 20 and 40 or a voltage smaller than a second threshold value is applied between the electrodes 20 and 40, a current flows between the electrodes 20 and 40; but when a voltage equal to or less than the first threshold value and equal to or larger than the second threshold value is applied between the electrodes 20 and 40, no currents flow between the electrodes 20 and 40.

Consequently, when the first potential difference and the second potential difference are set to be the voltage making a current flow between the electrodes 20 and 40 constituting the selection pixels, and the voltage making no currents flow between the electrodes 20 and 40 constituting the non-selection pixels, then energizations are suppressed even when potential differences are generated between the electrodes 20 and 40 constituting the non-selection pixels around a selection pixel owing to an influence from the selection pixel. Consequently, the non-selection pixels are not colored, and only the selection pixel is colored. Thus, it is possible to display a high resolution image.

However, when the electrochromic display device 100 is driven at a high speed, then the nonlinearity of the current-voltage characteristics between the electrodes 20 and 40 is broken, and the non-selection pixels also become colored owing to leakage currents (by the remaining electric current being moved).

Accordingly, the present invention performs energization (applied voltage of the first potential difference) to color the pixels in between the electrodes forming the selection pixels. Further, immediately after that, the energization (applied voltage of the second potential difference) in the reverse direction to eliminate the electric charge generated by the energization to color the pixels, thereby prevents generation of leakage currents.

An example of the display operation of making the electrochromic display device 100 display an image will be described more concretely.

The control section 600 applies the first negative voltage (for example, −4.0V≦first negative voltage≦−2.5V) to the line of the first row (the first electrode 20 in the first row), and applies the first positive voltage (for example, +2.5V≦first positive voltage≦+4.0V) to the second electrode 40 constituting a selection pixel among the pixels in the line of the first row. Thereby the control section 600 applies the voltage of the first potential difference between these electrodes 20 and 40. Immediately after that, the control section 600 applies the second positive voltages (for example, +2.5V≦second positive voltage≦+6.0V) to the first electrodes 20, and applies the second negative voltages (for example, −6.0V≦second negative voltage≦−2.5V) to the second electrodes 40. Thereby the control section 600 applies the voltages of the second potential differences between the electrodes 20 and 40.

In the pixel 60 to which the voltage of the first potential difference is applied, a current flows from the second electrode 40 to the first electrode 20 through the electrochromic composition 52, and the electrochromic composition 52 causes an electrochemical change at the interface (on the surface of the second electrode 40) between the electrochromic composition layer 50 and the second electrode 40. Consequently, the selection pixel in the line of the first row is colored. Further, in between the electrodes constituting the pixels 60, the electric charge is generated as the voltage of the first potential difference is applied, however, the generated electric charge is to be eliminated by the application of the voltage of the second potential difference immediately after that.

Next, the control section 600 applies the first negative voltage to the line of the second row (the first electrode 20 in the second row), and applies the first positive voltage to the second electrode 40 constituting a selection pixel among the pixels in the line of the second row to apply the voltage of the first potential difference between these electrodes 20 and 40. Thereby, the control section 600 colors the selection pixel in the line of the second row. Immediately after that, the control section 600 applies the second positive voltages to the first electrodes 20, and applies the second negative voltages to the second electrodes 40. Thereby the control section 600 applies the voltages of the second potential differences between these electrodes 20 and 40 so that the electric charge generated in between these electrodes as the voltage of the first potential difference is applied is to be eliminated.

Then, the control section 600 performs the processing similar to that mentioned above to the third row, the fourth row, the fifth row, and so forth to make the electrochromic display device 100 display an image for 1 frame (1 page).

(Erasion Operation)

Moreover, the control section 600 controls, for example, the first electrode selecting section 300 and the second electrode selecting section 500 to perform energizations in the directions reverse to those of the energizations for a display (coloring) through the first voltage switching sections 200 and the second voltage switching sections 400, that is, to make currents flow from the first electrodes 20 to the second electrodes 40. Thereby, the control section 600 erases the image displayed in the electrochromic display device 100.

To put it concretely, the control section 600 erases the coloring of a selection pixel by applying a voltage of a third potential difference between the first electrode 20, used as a positive electrode, and the second electrode 40, used as a negative electrode, both constituting the selection pixel. The control section 600 thereby erases the image displayed in the electrochromic display device 100.

To put it more concretely, the first electrode selecting section 300 selects the first electrode 20 in an order of the first row→the second row→the third row→ . . . , according to the control signal input from the control section 600. For example, as shown in FIG. 5, the first electrode selecting section 300 applies a predetermined positive voltage (hereinafter referred to as “a third positive voltage”) to the selected first electrode 20. Incidentally, the plurality of first electrodes 20 are designed so as not to be selected together at the same time.

Further, the second electrode selecting section 500 selects the second electrode 40 in a state of being synchronized with the selection of the first electrode 20 by the first electrode selecting section 300, according to the control signal input from the control section 600. That is to say, when the first electrode 20 provided at the first row is selected by the first electrode selecting section 300, the second electrode selecting section 500 selects the second electrode 40 to form the pixel 60 to be erased provided at the first row (which is the pixel 60 currently colored). For example, as shown in FIG. 5, the second electrode selecting section 500 applies a predetermined negative voltage (hereinafter referred to as “a third negative voltage”) to the selected second electrode 40.

That is to say, the third positive voltage is applied to the first electrode 20, and the third negative voltage is applied to the second electrode 40, thereby the voltage of the third potential difference is applied between the electrodes.

The third potential difference can be set arbitrarily, as long as it is a voltage between the electrodes capable of erasing the colored pixels 60. The third potential difference depends on the material of the first electrode 20 and the second electrode 40, and the like, thus the concrete third potential difference is difficult to be generally expressed, however, it for example ranges in 2.0V≦third potential difference≦5.0V.

Further, the time of the applied voltage of the third potential difference (application period) is determined according to the scanning speed.

Incidentally, the erasion of the image displayed in the electrochromic display device 100 is performed by the energizations in the directions reverse to those of the energizations for a display, or is performed by intercepting the energizations for the display and leaving the display apparatus 100 as it is, but the energizations in the directions reverse to those of the energizations for the display can execute the erasion operation more rapidly.

Here, it is necessary for a conventional display device using the electrochromic composition 52 to which the adsorbents 53 (aluminum oxides and/or aluminum hydroxides) are not added to strictly control the energizing quantities of the energizations for erasion. This is because the leuco dyes move to the interfaces (the surfaces of the first electrodes 20) between the electrochromic composition layer 50 and the first electrodes 20 by the energizations for the erasion to be colored, and, as the result, a display is not erased sometimes.

On the contrary, in the electrochromic display device 100 of the present embodiment, even when the energizing quantities of the energizations for erasion are not strictly controlled unlike the conventional display device, the leuco dyes are adsorbed by the adsorbents 53 at the time of energizations for erasion, and consequently it can be prevented that the leuco dyes move to the interfaces (the surfaces of the first electrodes 20) between the electrochromic composition layer 50 and the first electrodes 20 and are colored.

To put it concretely, the leuco dyes are polarized in solutions. The adsorbents 53 have the features that their specific surface areas are large and their adsorption abilities are high, and their surfaces are polarized. Because the second electrodes 40 are positive electrodes in the energizations of a color display, the leuco dyes, which are electron donatives, give electrons to the second electrodes 40 to be colored. Thus a display is performed. On the other hand, because the energizations are performed in the directions reverse to those of the energizations for the display in the energizations for erasion, the second electrodes 40 are used as the negative electrodes. The leuco dyes receive electrons from the second electrodes 40 of the negative electrodes to be erased, and thus the colors are erased. Then, the leuco dyes changed to be colorless move into the directions of the first electrodes 20, but the leuco dyes do not reach the first electrodes 20 owing to the existence of the adsorbents 53 having high adsorption abilities and polarized surfaces, and the leuco dyes move to the adsorbents 53 to be trapped and adsorbed. Thereby, the electrochromic display device 100 of the present embodiment can prevent the leuco dyes from moving to the interfaces (the surfaces of the first electrodes 20) between the electrochromic composition layer 50 and the first electrodes 20 to be colored at the time of the energizations for erasion.

EXAMPLES

In the following, the present invention will be further described in detail by means of a concrete examples, but the present invention is not limited to the examples.

(Making of Electrochromic Display Device)

A rectangular non-alkali glass substrate having a thickness of 0.7 mm was used as the second substrate 30, and an ITO was formed on one surface (the under surface) of the second substrate 30 by sputtering. The sputtered ITO had a film thickness of 200 nm and a surface resistance of 10 Ω/□. The ITO formed by the sputtering was patterned into stripes each having a width of 0.42 mm and a pitch of 0.45 mm by the use of the photolithographic method. Thus the second electrodes 40 were made.

Similarly, a rectangular non-alkali glass substrate was used as the first substrate 10, and chromium was formed on one surface (the upper surface) of the first substrate 10 by sputtering. An oxide film (chromium oxide) was formed on the surface of the sputtered chromium. The sputtered chromium (including the chromium oxide on the surface thereof) had a film thickness of 200 nm and a surface resistance of 1 Ω/□. The chromium (including the chromium oxide on the surface thereof) formed by the sputtering was patterned into stripes each having a width of 0.42 mm and a pitch of 0.45 mm by the use of the photolithographic method. Thus the first electrodes 20 were made.

Next, the spacer 51 (which is of granular body ("micro pearl" (particle diameter of 50 μm) available from Sekisui Chemical Co., Ltd.)) and the electrochromic composition 52 to which and predetermined additives (display quality deterioration inhibitors, adsorbents 53, polymer compounds, or the like) were added (hereinafter referred to as "electrochromic compositions A"), are mixed so as to be of a paste form are sandwiched by the first substrate 10 forming the first electrodes 20 and the second substrate 30 forming the second electrodes 40. Then, the first electrodes 20 and the second electrodes 40 are adjusted so as to be perpendicular to each other and the pixels 60 are positioned at the intersecting portion, and thus the electrochromic display device 100 (hereinafter referred to as "display device A") was made.

The composition of each of the electrochromic compositions A was as follows:

100 mg of supporting electrolyte (tetra-n-butylammonium tetrafluoroborate ($(n\text{-}C_4H_9)_4NBF_4$)), 1.0 g of polar solvent (N,N-dimethylacetamide), 300 mg of leuco dye (leuco dye which colors to black as shown in the following formula (1)), 56 mg of hydroquinone derivative (hydroquinone), 15 mg of ferrocene derivative (ferrocene), 106 mg of a compound having a carbonyl group (dibenzoyl derivative (dibenzoyl)), 75 mg of adsorbent 53 (aluminum oxide; activated alumina C200 available from Nippon Light Metal Co., Ltd.), and 25 mg of polymer compound (polyvinyl butyral; S-LEC BH3 available from Sekisui Chemical Co., Ltd.).

[Formula 1]

(1)

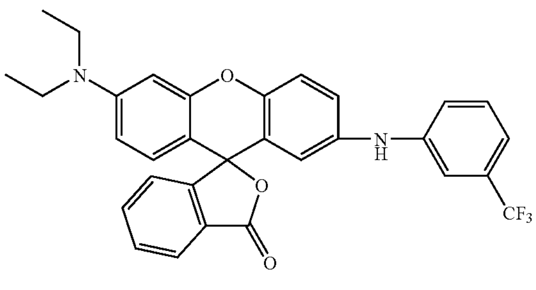

(Display Operation)

The first voltage switching sections 200 and the second voltage switching sections 400 were connected to the line electrodes (first electrodes 20) and data electrodes (second electrodes 40) of the display device A, respectively, and a display apparatus 1000 having the display device A was made as the electrochromic display device 100.

Next, the energizations for display were performed by the use of a passive matrix driving method. To put it concretely, the first negative voltage (−3.5 V) was applied to the first electrode 20, and the first positive voltage (+3.5 V) was applied to the second electrode 40, thereby the voltage of the first potential difference (7.0 V) was applied in between the electrodes. Immediately after that, the second positive voltage (+4.2 V) was applied to the first electrode 20 and the second negative voltage (−4.2 V) was applied to the second electrode 40, thereby the voltage of the second potential difference (8.4 V) was applied in between the electrodes. The ratio of the application time of the voltage of the first potential difference and that of the second potential difference was set to be the application time of the voltage of the first potential difference: the application time of the voltage of the second potential difference=1:0.5.

Then, this voltage application processing was performed for each line in a predetermined speed, so as to perform scanning, thereby an image was displayed. Further, the scanning was performed repeatedly, thereby the image was displayed repeatedly.

Here, example 1-1 was performed with the scanning under the speed of 8 msec/1 line, and example 1-2 was performed therewith under the speed of 2 msec/1 line.

Figure 11:
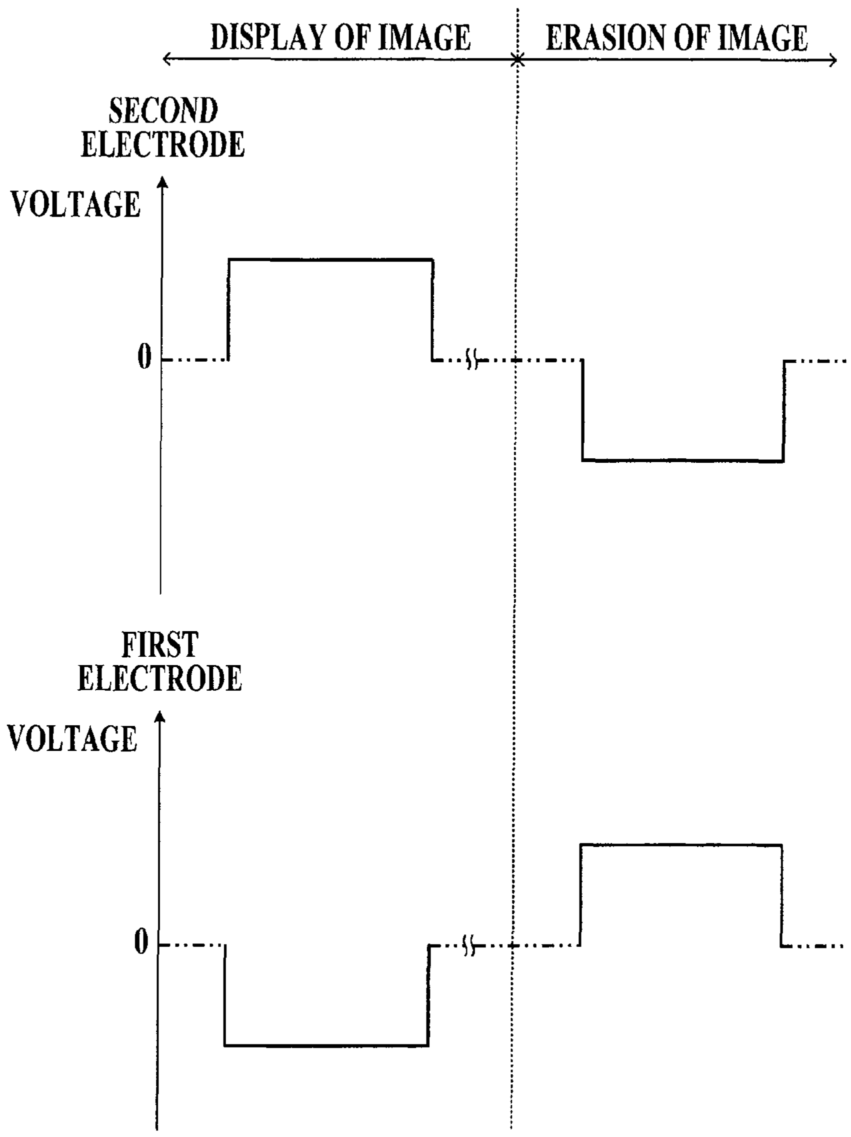
FIG. 11 is a diagram for illustrating how to apply a voltage to the electrochromic display device according to a conventional manner.

Further, as comparative examples, an image was displayed by applying voltage performed for the conventional electrochromic display device (that is to say, the energization in the reverse direction is not performed immediately after the energization to color the pixels (see FIG. 11)).

To put it concretely, a display apparatus 1000 including the display device A was used, wherein a predetermined negative voltage (−2.0 V) was applied to the first electrode 20, and a predetermined positive voltage (+2.0 V) was applied to the second electrode 40, thereby the voltage of a predetermined potential difference (4.0 V) was applied in between the electrodes.

Then, this voltage application processing was performed for each line in a predetermined speed, so as to perform scanning, thereby an image was displayed. Further, the scanning was performed repeatedly, thereby the image was displayed repeatedly.

Here, comparative example 1-1 was performed with the scanning under the speed of 8 msec/1 line, and comparative example 1-2 was performed therewith under the speed of 2 msec/1 line.

(Results)

Figure 7:
FIG. 7 is a diagram showing a result of example 1-1.
Figure 8:
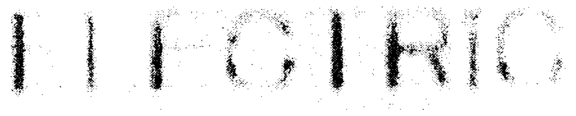
FIG. 8 is a diagram showing a result of example 1-2.
Figure 9:
FIG. 9 is a diagram showing a result of comparative example 1-1.
Figure 10:
FIG. 10 is a diagram showing a result of comparative example 1-2.

FIG. 7 shows a part of an image displayed in the example 1-1, FIG. 8 shows a part of an image displayed in the example 1-2, FIG. 9 shows a part of an image displayed in the comparative example 1-1, and FIG. 10 shows a part of an image displayed in the comparative example 1-2.

It was found out that the image displayed in the comparative example 1-2 (2 msec/line) resulted in more blurriness than the image displayed in the comparative example 1-1 (8 msec/line).

Further, it was found out that the image displayed in the example 1-2 (2 msec/line) resulted in more blurriness than the image displayed in the example 1-1 (8 msec/line).

That is to say, it was found out that the image to be displayed resulted in more blurriness as the scanning speed becomes faster (that is, as the vertical scanning frequency increases), both in the examples and in the comparative examples.

However, it was also found out that the image displayed in the example 1-1 was clearer than the image displayed in the comparative example 1-1, and that the image displayed in the example 1-2 was clearer than the image displayed in the comparative example 1-2.

Further, it was found out that although the image displayed in the example 1-2 was inferior to the image displayed in the example 1-1 in clarity, however the quality thereof was capable of sufficiently meeting utility.

That is to say, by performing the energization to color pixels, and by performing enegization in the reverse direction immediately after that, high-speed display of an image with high quality can be realized, without being provided with a partition wall.

According to the embodiment of the present invention as described above, provided is the electrochromic display device 100, comprising: a first substrate 10; a first electrode 20 provided in an upper surface of the first substrate 10; a second substrate 30 formed by a transparent material, the second substrate 30 being provided above the first substrate 10 to be opposed to the first substrate 10; a second electrode 40 provided in a lower surface of the second substrate 30, at least a part of the second electrode 40 being formed by a transparent electrode material; and an electrochromic composition layer 50 provided in between the first substrate 10 and the second substrate 30, wherein the electrochromic display device 100 is driven by a passive matrix drive in which the electrochromic display device 100 performs a display by an energization between the first electrode 20 and the second electrode 40, and performs an erasion of the display by an energization in a direction reverse to a direction of the energization between the first electrode 20 and the second electrode 40 for the display, wherein the first electrode 20 comprises a plurality of electrodes which extend parallelly, wherein the second electrode 40 comprises a plurality of transparent display electrodes which extend parallelly in a direction perpendicular to an extending direction of the first electrode 20, wherein a pixel 60 is formed in a region where the first electrode 20 and the second electrode 40 are in a grade separated crossing, and wherein when the display is performed, voltage application processing is performed in which: (i) the first electrode 20 forming a selection pixel is set as a negative electrode, and the second electrode 40 forming the selection pixel is set as a positive electrode, to apply a voltage of a first potential difference in between the first electrode 20 and the second electrode 40, immediately followed by (ii) the first electrode 20 being set as the positive electrode, and the second electrode 40 being set as the negative electrode, to apply a voltage of a second potential difference which is equal to or more than the first potential difference in between the first electrode 20 and the second electrode 40.

Consequently, immediately after the energization to color the selection pixels, the energization in the reverse direction (with reverse polarity) from that of the energization to color the selection pixels is performed so as to eliminate the electric charge generated in between the electrodes constituting the selection pixels, thereby the electric charge is prevented from remaining. Accordingly, the non-selection pixels are not colored without the influence from the remaining electric charge, and the erasion of the displayed image does not take much time without the same. Thus, the high-speed display of an image with high quality can be realized, without being provided with a partition wall.

Further, according to the embodiment of the present invention as described above, provided is the electrochromic display device 100, wherein a ratio of an application time of the voltage of the second potential difference to an application time of the voltage of the first potential difference ranges in 0.25 to 0.5.

Accordingly, the electric charge generated in between the electrodes forming the selection pixels can reliably be eliminated.

Incidentally, the embodiment is solely for the purpose of illustration and is not to be construed as limitations of the present invention, as many modifications are possible without departing from the spirit or scope thereof.

(Modification 1)

In the above described embodiment, when the display is performed, the first application processing is performed. That is, the voltage of the first potential difference is applied in between the electrodes in a state where the first electrode 20 constituting the selection pixel is the negative electrode, and the second electrode 40 constituting the selection pixel is the positive electrode. Further, immediately after that, the voltage of the second potential difference which is equal to or more than the first potential difference is applied in between the electrodes, in a state where the first electrode 20 constituting the selection pixel is the positive electrode, and the second electrode 40 constituting the selection pixel is the negative electrode. Still further, the leuco dyes are moved in between the electrochromic composition layer 50 and the second electrode 40 (the surface of the second electrode 40) so as to be colored, thereby the image displayed from the upper surface side of the second substrate 30 is observed. However, the present invention is not limited to this. Alternatively, the followings can also be performed. For example, when the display is performed, the second application processing is performed. That is, the voltage of the first potential difference is applied in between the electrodes in a state where the first electrode 20 constituting the selection pixel is the positive electrode, and the second electrode 40 constituting the selection pixel is the negative electrode. Further, immediately after that, the voltage of the second potential difference which is equal to or more than the first potential difference is applied in between the electrodes, in a state where the first electrode 20 constituting the selection pixel is the negative electrode, and the second electrode 40 constituting the selection pixel is the positive electrode. Still further, the leuco dyes are moved in between the electrochromic composition layer 50 and the first electrode 20 (the surface of the first electrode 20) so as to be colored. When the second application processing is performed, the image displayed from the upper surface side of the second substrate 30 can be observed, through the second substrate 30, the second electrodes 40 and the electrochromic composition layer 50.

Further, when the display is performed, the first application processing and the second application processing may be performed one after the other.

The circuit configurations of each of the first voltage switching sections 200 and each of the second voltage switching sections 400 are not limited to those shown in FIGS. 3 and 4, respectively, but the circuit configurations of the first and second voltage switching sections 200 and 400 may be set arbitrarily as long as the following can be performed. That is, at the time of the display operation, the voltage of the first potential difference is applied in between the electrodes in a state where the first electrode 20 constituting the selection pixel is the negative electrode, and the second electrode 40 constituting the selection pixel is the positive electrode. Further, immediately after that, the voltage of the second potential difference which is equal to or more than the first potential difference is applied in between the electrodes, in a state where the first electrode 20 constituting the selection pixel is the positive electrode, and the second electrode 40 constituting the selection pixel is the negative electrode.

In the above described embodiment, the voltage was not applied in between the electrodes other than the ones constituting the selection pixels, however, the present invention is not limited to the above described. It is also possible to apply a predetermined low voltage or to supply a predetermined low current to the electrodes other than the ones constituting the selection pixels, so that the energization in the reverse direction from that between the electrodes constituting the selection pixels may be performed in between the electrodes other than the ones constituting the selection pixels. Thereby, the generation of the leakage current can further be suppressed.

According to a first aspect of the preferred embodiment of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a negative electrode, and the second electrode forming the selection pixel is set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode.

According to a second aspect of the preferred embodiment of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a positive electrode, and the second electrode forming the selection pixel is set as a negative electrode, to apply a voltage of a first potential difference in between the first electrode and the second electrode, immediately followed by (ii) the first electrode being set as the negative electrode, and the second electrode being set as the positive electrode, to apply a voltage of a second potential difference which is equal to or more than the first potential difference in between the first electrode and the second electrode.

According to a third aspect of the preferred embodiment of the present invention, there is provided an electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, first voltage application processing and second voltage application processing are performed one after another, wherein the first voltage application processing comprises: (i) the first electrode forming a selection pixel being set as a negative electrode, and the second electrode forming the selection pixel being set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode, and wherein the second voltage application processing comprises: (iii) the first electrode forming the selection pixel being set as a positive electrode, and the second electrode forming the selection pixel being set as a negative electrode, to apply a voltage of a first potential difference in between the first electrode and the second electrode, immediately followed by (iv) the first electrode being set as the negative electrode, and the second electrode being set as the positive electrode, to apply a voltage of a second potential difference which is equal to or more than the first potential difference in between the first electrode and the second electrode.

Preferably, a ratio of an application time of the voltage of the second potential difference to an application time of the voltage of the first potential difference ranges in 0.25 to 0.5.

According to the aspects of the preferred embodiment of the present invention, in the electrochromic display device driven by the passive matrix drive, when the display is performed, any one of the following voltage application processing is performed. In the first application processing, the voltage of the first potential difference is applied in between the electrodes in a state where the first electrode constituting the selection pixel is the negative electrode, and the second electrode constituting the selection pixel is the positive electrode. Further, immediately after that, the voltage of the second potential difference which is equal to or more than the first potential difference is applied in between the electrodes, in a state where the first electrode constituting the selection pixel is the positive electrode, and the second electrode constituting the selection pixel is the negative electrode. In the second application processing, the voltage of the first potential difference is applied in between the electrodes in a state where the first electrode constituting the selection pixel is the positive electrode, and the second electrode constituting the selection pixel is the negative electrode. Further, immediately after that, the voltage of the second potential difference which is equal to or more than the first potential difference is applied in between the electrodes, in a state where the first electrode constituting the selection pixel is the negative electrode, and the second electrode constituting the selection pixel is the positive electrode. Alternatively, the first application processing and the second application processing may be performed one after the other.

Consequently, immediately after the energization to color the selected pixels (selection pixels), the energization in the reverse direction from that of the energization to color the selection pixels is performed so as to eliminate the electric charge generated in between the electrodes constituting the selection pixels, thereby the electric charge is prevented from remaining. Accordingly, the non-selection pixels are not colored without the influence from the remaining electric charge, and the erasion of the displayed image does not take much time without the same. Thus, the high-speed display of an image with high quality can be realized, without being provided with a partition wall.

The entire disclosure of Japanese Patent Application No. 2009-110286 filed on Apr. 30, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a negative electrode, and the second electrode forming the selection pixel is set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode.

2. An electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, voltage application processing is performed in which: (i) the first electrode forming a selection pixel is set as a positive electrode, and the second electrode forming the selection pixel is set as a negative electrode, to apply a voltage of a first potential difference in between the first electrode and the second electrode, immediately followed by (ii) the first electrode being set as the negative electrode, and the second electrode being set as the positive electrode, to apply a voltage of a second potential difference which is equal to or more than the first potential difference in between the first electrode and the second electrode.

3. An electrochromic display device comprising:

a first substrate;

a first electrode provided in an upper surface of the first substrate;

a second substrate formed by a transparent material, the second substrate being provided above the first substrate to be opposed to the first substrate;

a second electrode provided in a lower surface of the second substrate, at least a part of the second electrode being formed by a transparent electrode material; and an electrochromic composition layer provided in between the first substrate and the second substrate, wherein the electrochromic display device is driven by a passive matrix drive in which the electrochromic display device performs a display by an energization between the first electrode and the second electrode, and performs an erasion of the display by an energization in a direction reverse to a direction of the energization between the first electrode and the second electrode for the display, wherein the first electrode comprises a plurality of electrodes which extend parallely, wherein the second electrode comprises a plurality of transparent display electrodes which extend parallely in a direction perpendicular to an extending direction of the first electrode, wherein a pixel is formed in a region where the first electrode and the second electrode are in a grade separated crossing, and wherein when the display is performed, first voltage application processing and second voltage application processing are performed one after another, wherein the first voltage application processing comprises: (i) the first electrode forming a selection pixel being set as a negative electrode, and the second electrode forming the selection pixel being set as a positive electrode, to apply a voltage of a first potential difference in between the first electrode and the second electrode, immediately followed by (ii) the first electrode being set as the positive electrode, and the second electrode being set as the negative electrode, to apply a voltage of a second potential difference which is equal to or more than the first potential difference in between the first electrode and the second electrode, and wherein the second voltage application processing comprises: (iii) the first electrode forming the selection pixel being set as a positive electrode, and the second electrode forming the selection pixel being set as a negative electrode, to apply a voltage of a first potential difference in between the first electrode and the second electrode, immediately followed by (iv) the first electrode being set as the negative electrode, and the second electrode being set as the positive electrode, to apply a voltage of a second potential difference which is equal to or more than the first potential difference in between the first electrode and the second electrode.

4. The electrochromic display device as claimed in claim 1, wherein a ratio of an application time of the voltage of the second potential difference to an application time of the voltage of the first potential difference ranges in 0.25 to 0.5.

5. The electrochromic display device as claimed in claim 2, wherein a ratio of an application time of the voltage of the second potential difference to an application time of the voltage of the first potential difference ranges in 0.25 to 0.5.

6. The electrochromic display device as claimed in claim 3, wherein a ratio of an application time of the voltage of the second potential difference to an application time of the voltage of the first potential difference ranges in 0.25 to 0.5.

* * * * *